(12) United States Patent  
Nelogal et al.

(10) Patent No.: US 9,104,598 B2  
(45) Date of Patent: Aug. 11, 2015

(54) SYSTEMS AND METHODS FOR MEDIUM ERROR REPORTING AND HANDLING IN STORAGE DEVICES

(71) Applicants: Chandrashekar Nelogal, Round Rock, TX (US); David M. Pereira, Austin, TX (US)

(72) Inventors: Chandrashekar Nelogal, Round Rock, TX (US); David M. Pereira, Austin, TX (US)

(73) Assignee: Dell Products LP, Round Rock, TX (US)

( * ) Notice: Subject to any disclaimer, the term of this patent is extended or adjusted under 35 U.S.C. 154(b) by 264 days.

(21) Appl. No.: 13/917,015

(22) Filed: Jun. 13, 2013

(65) Prior Publication Data

US 2014/0372793 A1    Dec. 18, 2014

(51) Int. Cl.
*G06F 11/00* (2006.01)
*G06F 11/10* (2006.01)
*G06F 11/07* (2006.01)

(52) U.S. Cl.
CPC ........ *G06F 11/1076* (2013.01); *G06F 11/0784* (2013.01)

(58) Field of Classification Search
CPC .................. G06F 11/1076; G06F 11/0784
See application file for complete search history.

(56) References Cited

U.S. PATENT DOCUMENTS

| | | | |
|---|---|---|---|
| 5,951,691 A * | 9/1999 | Ng et al. ..................... 714/5.11 |
| 8,370,659 B2 | 2/2013 | Chiasson et al. |
| 2003/0212859 A1* | 11/2003 | Ellis et al. ..................... 711/114 |
| 2005/0193235 A1* | 9/2005 | Sandorfi et al. .................... 714/6 |
| 2010/0031000 A1* | 2/2010 | Flynn et al. ................... 711/216 |
| 2012/0110262 A1 | 5/2012 | Zhang et al. |
| 2012/0137063 A1* | 5/2012 | Horibe et al. ................. 711/113 |

OTHER PUBLICATIONS

Section 4.5 of Information Technology, SCSI Primary Commands—4 (SPC-4), Project T10/1731-D, Revision, 36e, Aug. 24, 2012, 36 pgs.

\* cited by examiner

*Primary Examiner* — Yolanda L Wilson
(74) *Attorney, Agent, or Firm* — Egan, Peterman & Enders LLP.

(57) ABSTRACT

Systems and methods are provided that may be used to identify and report multiple information units (e.g., logical blocks) having medium errors within a given composite information structure (e.g., physical block) of a storage device (e.g., such as a hard drive) whenever any single information unit having an error within the same composite information structure is accessed.

20 Claims, 6 Drawing Sheets

SYSTEMS AND METHODS FOR MEDIUM ERROR REPORTING AND HANDLING IN STORAGE DEVICES

FIELD OF THE INVENTION

This invention relates generally to information handling systems and, more particularly, to medium error reporting and handling in persistent storage devices.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems and methods for controlling data transfer to and from a redundant array of independent disks (RAID) memory storage system are known in the art. A RAID system is a data storage system wherein data is distributed across a group of hard disk drive storage devices functioning as a small storage unit. Often, information stored on each disk is duplicated on other disks in the array, creating redundancy to ensure no information is lost if disk failure occurs. Also, commonly, parity is calculated across a set of information stored on disks of the array. RAID systems achieve redundancy in two methods—mirroring and parity. Both mechanisms allow for regeneration of data in the event of disk failure or unreadable disks. The I/O operations on a storage device (hard disk drive) is accessed at the granularity of the size of a logical block and the logical blocks are addressed by logical block address.

In current conventional hard drive storage device implementations the logical block size and the physical block size are the same. While drives with 4096 byte block size are being introduced now, for backward compatibility with existing software these new drives are also available with 512 byte logical block size emulation. In such an emulation mode, each 4096 byte physical block contains eight 512 byte logical blocks. A conventional 4096 byte physical block drive that is emulating a 512 byte logical block size will report an error for a 512 byte logical block address (LBA) that has a medium error when that 512 byte block is read as part of an I/O operation. To report the error, the drive sends sense data with information of the location of the 512 byte logical block in which the medium error was discovered, and does not contain any information about other logical blocks which may have errors within the same 4096 byte physical block. Further information on Sense Data may be found in Section 4.5 of "Information technology-SCSI Primary Commands-4 (SPC-4)," Project T10/1731-D (Revision 36e, 24 Aug. 2012) of the Accredited Standards Committee INCITS (InterNational Committee for Information Technology Standards), Reference number ISO/IEC 14776-454: 200x, ANSI INCITS.***: 200x (Aug. 24, 2012), which is incorporated herein by reference.

Figure 1:
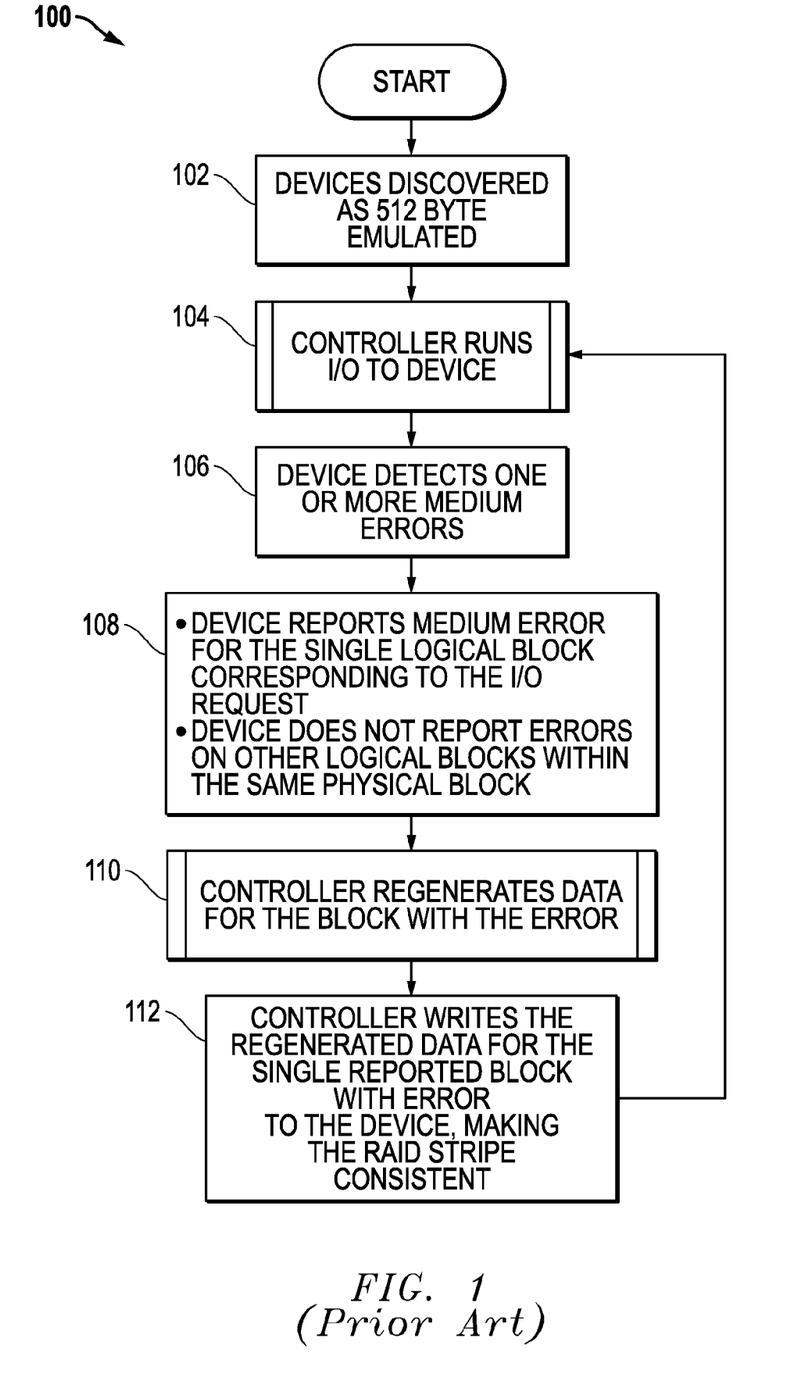
FIG. 1 illustrates a conventional technique implemented by a RAID controller.

FIG. 1 illustrates a conventional technique 100 implemented by a redundant array of independent disks (RAID) controller for handling medium error reporting for a RAID data storage system that includes hard drive storage devices having 4096 byte physical block size that are operating with 512 byte logical block size emulation. As shown, methodology begins in step 102 where the storage devices are discovered by the RAID controller as being 512 byte emulated for the input/output (I/O) operations. Next in step 104, the RAID controller runs I/O to a 512 byte logical block of the given storage device (hard drive). In step 106, an individual disk controller of the storage device detects one or more storage medium errors on the current read operation for the current 512 byte logical block. In step 108, the storage device disk controller reports the detected medium error corresponding to the current I/O request for the single 512 byte logical block to the RAID controller. The storage device disk controller may detect, but does not report, medium errors that exist within the seven other 512 byte logical blocks of the same 4096 byte physical block of the storage device. In step, 110, the RAID controller responds to the reported error by regenerating the data for the single 512 byte logical block with the error from a mirrored drive, or by using the parity information previously calculated and stored. The RAID controller then writes the regenerated data in step 112 for the single 512 byte having the detected error to the storage device, making the RAID stripe consistent. The disk controllers will reallocate the logical blocks to a different physical location while keeping the logical block address the same. Hence the data gets "corrected" while physically the data resides in a different location on the drive.

SUMMARY OF THE INVENTION

Disclosed herein are systems and methods for handling storage medium errors that may be implemented to identify and report multiple information units (e.g., logical blocks) having errors within a given composite information structure (e.g., physical block) of a storage device (e.g., such as a hard drive) whenever any single information unit having an error within the same composite information structure is accessed (e.g., during a read cycle or during a read portion of a read-modify-write cycle). In this regard, the information units are individually accessible and addressable from the composite information structure.

In one embodiment, the disclosed systems and methods may be implemented to identify and report all individual information units having errors within the same composite information structure at the same time, e.g., at the same time one of the individual information units is accessed for I/O operations or at the same time only a portion of the individual information units within the same composite information structure are accessed for I/O operations. In yet another embodiment, the disclosed systems and methods may be implemented to identify and report at least a first one of the individual information units having medium errors within the same composite information structure at the same time at least one second and different one of the individual information units is accessed for I/O operations, and advantageously before the first one of the individual information units is accessed for an attempted I/O operation, i.e., prior to discovery of the medium error in the first one of the individual information units during an attempted I/O operation such as during an attempted read cycle or during an attempted read portion of a read-modify-write cycle.

The disclosed systems and methods may be implemented using a RAID controller of an information handling system that is coupled to perform read and write (I/O operations) on one or more storage devices of a storage subsystem, thus improving the performance of the storage subsystem. In one exemplary embodiment, the disclosed systems and methods may be implemented using any software and/or firmware layer configuration that itself implements RAID or similar redundancy logic, e.g., such as a software RAID layer. Exemplary system installations in which the disclosed systems and methods may be advantageously employed include, but are not limited to, cloud computing platforms that impose strict requirements on latency for data accesses and enterprise storage systems that are required to be highly reliable. In this regard, the disclosed systems and methods may be implemented to help meet the low latency cloud computing platform requirements by regenerating data in advance rather than at the time of a data request, and may be implemented to help in increasing the reliability of an enterprise data storage system by reducing the likelihood of a "double-fault" (which makes data recovery impossible) by detecting and repairing multiple logical block media errors as soon as possible.

Examples of such system configurations include, but are not limited to, an information handling system (e.g., server) including a RAID controller that is coupled to multiple hard drive storage devices that are coupled to the information handling system. In one exemplary embodiment where a storage device (e.g., hard disk) is in a RAID configuration, the RAID parity information may be calculated across a set of information stored on disks of a RAID array and may be used to regenerate data for all emulated logical blocks having errors within a given physical block at the same time, resulting in greater productivity and reliability for those RAID installations that employ storage devices operating with smaller logical blocks emulated on larger physical blocks.

The disclosed systems and methods may be advantageously implemented in one exemplary embodiment to allow a processing device within a storage device to identify and efficiently communicate to a RAID controller the location of all medium errors present in a given composite information structure (e.g., such as a 4096 byte or other size physical block) at the same time that any individual information unit (e.g., such as a 512 byte logical block) within the composite information structure is read by the storage device disk controller as part of an I/O operation. Such an embodiment may be implemented in combination with legacy software and/or operating systems that are configured for operation with 512 byte drives rather than 4096 byte native sector drives.

For example, given the case where an error is identified in a given emulated 512 byte LBA accessed within a 4096 byte physical block, it is often likely that there are additional medium errors present in at least some of the other seven (non-accessed) 512 byte LBAs within the same 4096 byte physical block. The disclosed systems and methods may advantageously address this situation in one embodiment by identifying and efficiently communicating to a RAID controller at the same time both the location of the currently-accessed LBA with a medium error and the location of all other (non-accessed) 512 byte LBAs of the same 4096 byte physical block that also contain medium errors. In this way, these additional LBA error locations in the same physical block do not remain unreported until they are accessed individually, as is the case with conventional RAID implementations. In this regard, any stripe/row within a conventional RAID configuration that contains a given LBA with a medium error will have inconsistent parity. In such a conventional implementation, the presence of a medium error will only be discovered when that particular LBA is read. When the LBA with a medium error is discovered, the data is regenerated using RAID parity or mirrored data. This conventional process delays the availability of the requested data to the host. If the LBAs with errors were known in advance, the data could be regenerated in advance of the host data request, thus optimizing media error handling.

In one exemplary embodiment, data in one or more logical block addresses (LBAs) with errors may be regenerated even before these LBAs are likely to be accessed, e.g., by a server or other configuration of information handling system coupled to access a hard disk storage device emulating multiple smaller logic blocks within a given larger physical block. Thus, in a RAID configuration embodiment, the disclosed systems and methods may be implemented to restore RAID parity consistency within a stripe/row as quickly as possible so as to be able to recover from other medium errors that may develop on locations in the same stripe/row. For example, in a RAID 5 configuration, if another medium error failure were to occur within the same RAID stripe/row, it would be impossible to regenerate data. The disclosed systems and methods may be advantageously implemented to greatly reduce the risk of such an occurrence.

Although described herein in relation to an exemplary 4096 byte physical block containing eight emulated 512 byte logical blocks, it will be understood that the disclosed systems and methods may be similarly implemented for handling storage device medium errors within smaller component information units of a larger composite information structure including, but not limited to, physical blocks that are larger or smaller than 4096 byte size and/or logical blocks that are smaller or larger than 512 byte size. Thus, it will be understood that in other embodiments a physical block may contain more or less than eight emulated logical blocks.

In one respect, disclosed herein is an information handling system, including: at least one storage device including storage media; at least one first processing device coupled to the storage device and configured to access the storage media for reading and writing data on the storage media as individual composite information structures having a first data size, and to provide data read from the storage media and to accept data for writing to the storage media as emulated information units having a second size, the second data size being smaller than the first data size such that each composite information structure is subdivided into multiple smaller emulated information units; and one or more second processing devices coupled to the first storage device and configured to provide data to the first processing device for writing as the emulated information units, and to accept read data from the first processing device as emulated information units. The first processing device may be further configured to detect the identity of multiple emulated information units having storage medium errors within a given composite information structure during a given access to the given composite information structure for input/output (I/O) operations on one or more of the emulated information units, and to then report the identity of the multiple detected emulated information units having medium errors within the same accessed composite information structure at the same time to the second processing devices.

In another respect, disclosed herein is a method for operating a storage device that includes storage media, including:

using at least one first processing device to access the storage media of the storage device for reading and writing data on the storage media as individual composite information structures having a first data size, and to provide data read from the storage media and to accept data for writing to the storage media as emulated information units having a second size, the second data size being smaller than the first data size such that each composite information structure is subdivided into multiple smaller emulated information units; using one or more second processing devices to provide data to the first processing device for writing as the emulated information units, and to accept read data from the first processing device as emulated information units; and using the first processing device to detect the identity of multiple emulated information units having storage medium errors within a given composite information structure during a given access to the given composite information structure for input/output (I/O) operations on one or more of the emulated information units, and to then report the identity of the multiple detected emulated information units having medium errors within the same accessed composite information structure at the same time to the second processing devices.

DESCRIPTION OF ILLUSTRATIVE EMBODIMENTS

Figure 2:
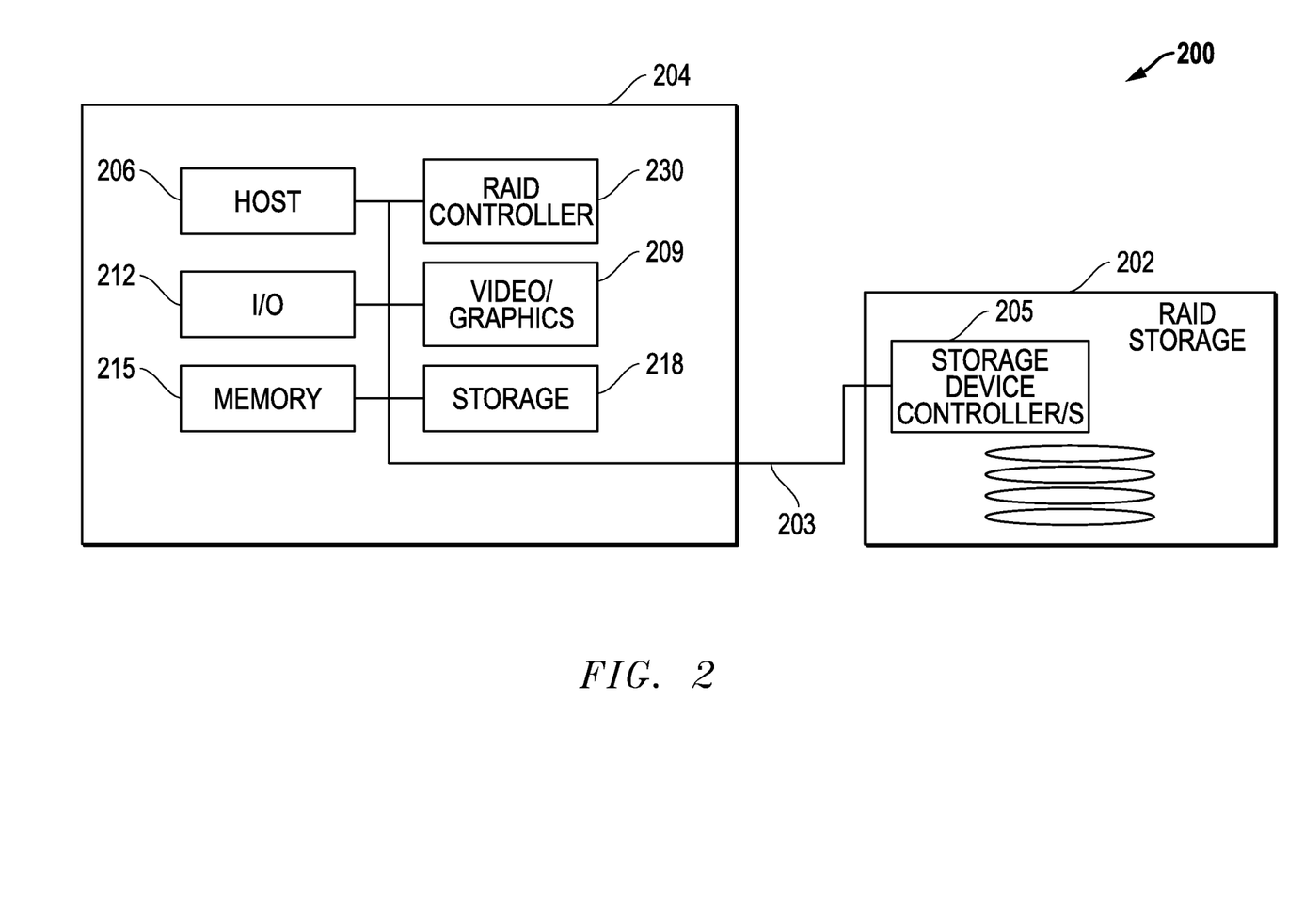
FIG. 2 illustrates a RAID system according to one exemplary embodiment of the disclosed systems and methods.

FIG. 2 illustrates one exemplary embodiment of a RAID system 200 that includes an information handling system 204 configured as a RAID system server coupled to RAID storage memory 202. RAID storage memory 202 includes an array of individual hard disk drive storage devices (RAID array) functioning as a single storage unit to which data is written by RAID system server 204. RAID system server 204 writes data to RAID storage memory 202 in a manner such that data is distributed across the multiple storage drives. Information stored on each disk drive of RAID storage memory 202 may be duplicated on other disks in the array, e.g., to create redundancy so that no data is lost if disk failure occurs. One or more processing device/s 205 in the form of individual disk controllers of respective individual disk drive storage devices of RAID storage memory 202 may also be present, e.g., to control I/O and servo operations for individual disk drives of RAID storage memory 202. Examples of suitable storage device disk controllers include, but are not limited to, small computer system interface (SCSI) controllers that may be individually provided for each disk drive in the RAID array.

As further shown in FIG. 2, system 204 may include host processor 206, communication media 203 (e.g., such as SCSI communication bus or other suitable data bus media such as Fibre Channel, Serial Attached SCSI, IDE, SATA, etc.), video/graphics hardware 209, storage 218, memory 215, input/output (I/O) 212, and RAID controller circuit 230 (e.g., RAID card such as PowerEdge RAID Controller (PERC) card available from Dell, Inc.). RAID controller circuit 230 is present in this embodiment for controlling transfer of data to and from RAID storage 202 via storage device disk controller/s 205. Further information on RAID controller circuits may be found, for example, in U.S. Pat. No. 8,370,659; and in United States Patent Application Publication 2012/0110262, each of which is incorporated herein by reference in its entirety for all purposes.

Still referring to FIG. 2, one or more communication bus media 203 may provide a mechanism for the various components of system 200 to communicate and couple with one another. Host processor 206 may be, for example, a CPU running a host operating system (OS) for RAID system server 204. Video/graphics 209, storage 218, memory 215, and I/O 212 may have the structure, and perform the functions, known to those of skill in the art. Besides memory 221 (e.g., RAM), processor 206 may include cache memory for storage of frequently accessed data, and storage 218 may include extended memory for processor 206.

It will be understood that the embodiment of FIG. 2 is exemplary only, and that an information handling system may be provided with one or more processing devices that may perform the functions of processing devices 206, 230 and 205, as well as other optional processing devices. Examples of types of processing devices that may be employed include, but are not limited to, central processing units (CPUs), embedded controllers, microcontrollers, application specific integrated circuits (ASICs), field programmable gate arrays (FPGAs), etc. It will also be understood that the particular configuration of RAID system 200 illustrated in FIG. 2 is exemplary only, and that other information handling system and storage system configurations are possible. In this regard, the disclosed systems and methods may be implemented in other storage configurations including one or more storage devices that are each configured for access on a larger composite information structure level that includes multiple (e.g., emulated) smaller information units.

Figure 3:
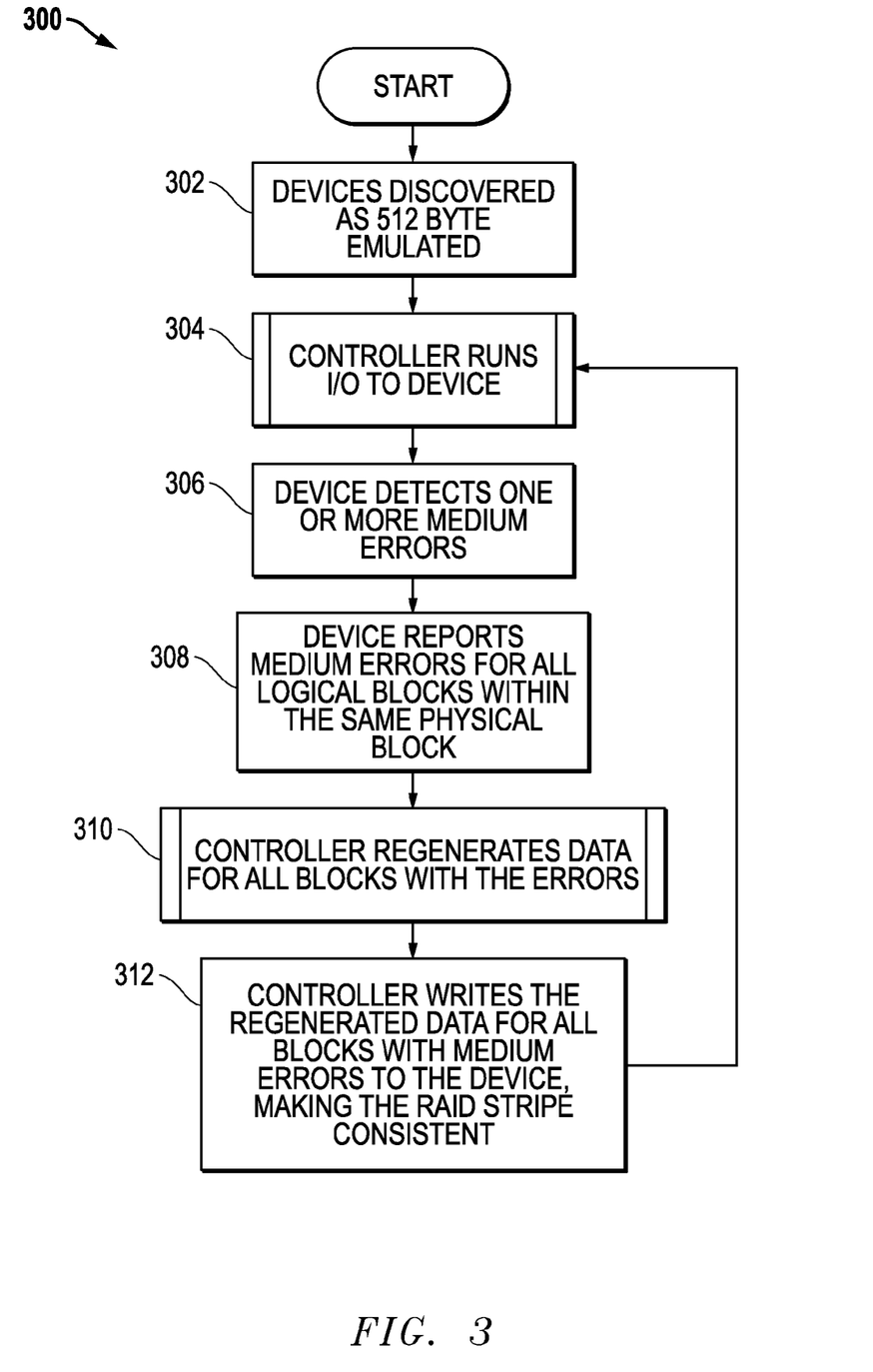
FIG. 3 illustrates methodology according to one exemplary embodiment of the disclosed systems and methods.

FIG. 3 illustrates one exemplary embodiment of a methodology 300 that may be employed to identify, report and regenerate data for multiple logical blocks having errors within a given physical block of a RAID storage device (e.g., such as one of multiple storage devices of a RAID storage memory 202 of RAID system 200 of FIG. 2 having 4096 byte physical block size that are operating with 512 byte emulation). In this regard, each storage device (e.g., hard drive) of RAID storage memory 202 may be configured to have 4096 byte physical block size with eight emulated 512 byte logical blocks being defined for each 4096 byte physical block size. However, it will be understood that a similar methodology may be implemented to identify and report multiple information units having medium errors within a given composite information structure of any other type of storage device whenever any single information unit having an error within the same composite information structure is accessed.

In the exemplary embodiment of FIG. 3, methodology 300 begins in step 302 where the storage devices are discovered by the RAID controller as being 512 byte-emulated for the present input/output (I/O) operations. Next in step 304, the RAID controller runs I/O operations to a given emulated 512 byte logical block of a storage device (e.g., hard drive) in the RAID storage memory. Such I/O operations may be initiated by the RAID controller, for example, in response to a 512 byte I/O request received from software and/or operating system (OS) executing on the host processing device (e.g., host 206 of RAID system 200). In this regard, legacy OS and software executing on the host processing device may be configured for 512 byte I/O operations, rather than OS and software configured for the newer 4096 byte physical block capability of current storage devices. It will be understood however, that OS and software compatible with 4096 byte I/O operations may also be present and executing on the host processing device together with the 512 byte legacy OS and/or software.

The RAID controller issues the I/O requests to a disk controller at the granularity of a logical block. To complete the requested 512 byte I/O operations, the disk controller accesses at the granularity of the 4096 byte physical block that includes the addressed logical block and services I/O requests to the smaller 512 byte logical block. In step 306, an individual disk controller of the accessed storage device operates to detect one or more storage medium errors within the given 4096 byte physical block that includes the requested emulated 512 byte logical block. Examples of possible types of such storage medium errors that may be detected include, but are not limited to, unrecoverable read error, read failure during a write I/O request (made in order to do read-modify-write), etc. To complete the requested emulated 512 byte I/O operations, the entire larger 4096 byte physical block is accessed that includes the particular smaller logical block designated for I/O operations. During this accessing step, all storage medium errors within the 4096 byte physical block are detected by the individual disk controller of the accessed storage device, including any storage medium errors corresponding to the current read operation for the current 512 byte logical block and/or that exist within any of the other 512 byte logical blocks within the same given 4096 byte physical block.

Figure 4:
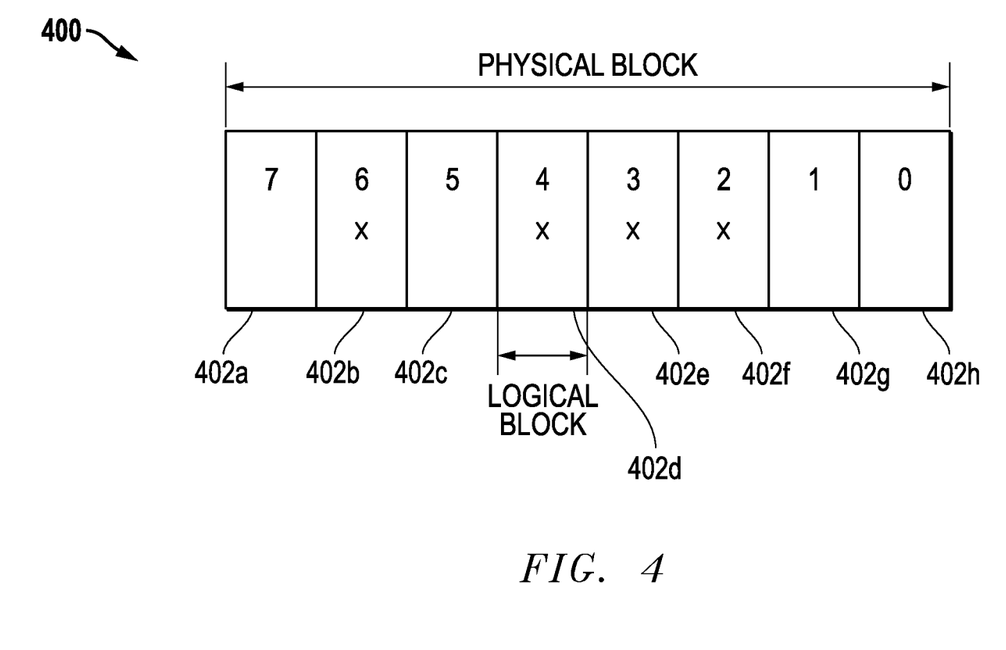
FIG. 4 illustrates an example of a physical block that includes eight emulated logical blocks according to one exemplary embodiment of the disclosed systems and methods.

FIG. 4 illustrates an example of a 4096 byte physical block 400 that includes eight emulated 512 byte logical blocks 402a-402h. A given hard drive storage device includes multiple such 4096 byte physical blocks 400. In FIG. 4, four of the emulated logical blocks (i.e., 402b, 402d, 402e and 402g of the illustrated physical block 400 have detected storage medium error conditions as designated by an "X" in the logical block. All of these illustrated errors are detected in step 306 during the same common I/O operation (e.g., read operation or read-modify-write operation) made to any given one or more of the logical blocks 402 (e.g., made to only one logical block 402 or made to a given portion of multiple logical blocks 402 that is less than all of the logical blocks 402 in the physical block 400) regardless of whether or not a storage medium error exists in the particular emulated 512 byte logical block/s that are the subject of the I/O operation.

Still referring to FIG. 3, in step 308, the individual disk controller of the accessed storage device of the RAID storage memory reports (e.g., to the RAID controller) at the same time (e.g., in a common data list) all errors that were detected in its storage medium within the given accessed 4096 byte physical block in step 306, i.e., before again accessing the same or different 4096 byte physical block for another I/O operation. This report includes any detected storage medium errors that exist within all eight emulated 512 byte logical blocks of the given accessed 4096 byte physical block of the particular accessed storage device of the RAID storage memory.

In step 310, the RAID controller sees the reported errors for the given drives within its RAID set(s) and responds to the reported errors by regenerating the data for each emulated 512 byte logical block that has a reported medium error. The regeneration is accomplished, for example, by reconstructing the contents of a given logical block from the parity information kept in the RAID drive set, or by accessing data kept in a mirror image drive of another storage device in the RAID set(s). Then in step 312, the RAID controller writes the regenerated data of step 310 for all emulated 512 byte logical blocks with reported medium errors to the storage device, making the RAID stripe consistent. Methodology 300 then returns to step 304 and repeats as shown. It will be understood that the illustrated methodology 300 of FIG. 3 is exemplary only, and that any other combination of fewer, additional, and/or alternative steps may be employed that is suitable for identifying, reporting and regenerating data for multiple information units (e.g., emulated logical blocks) having errors within a given composite information structure (e.g., physical block) of a storage device.

Figure 5:
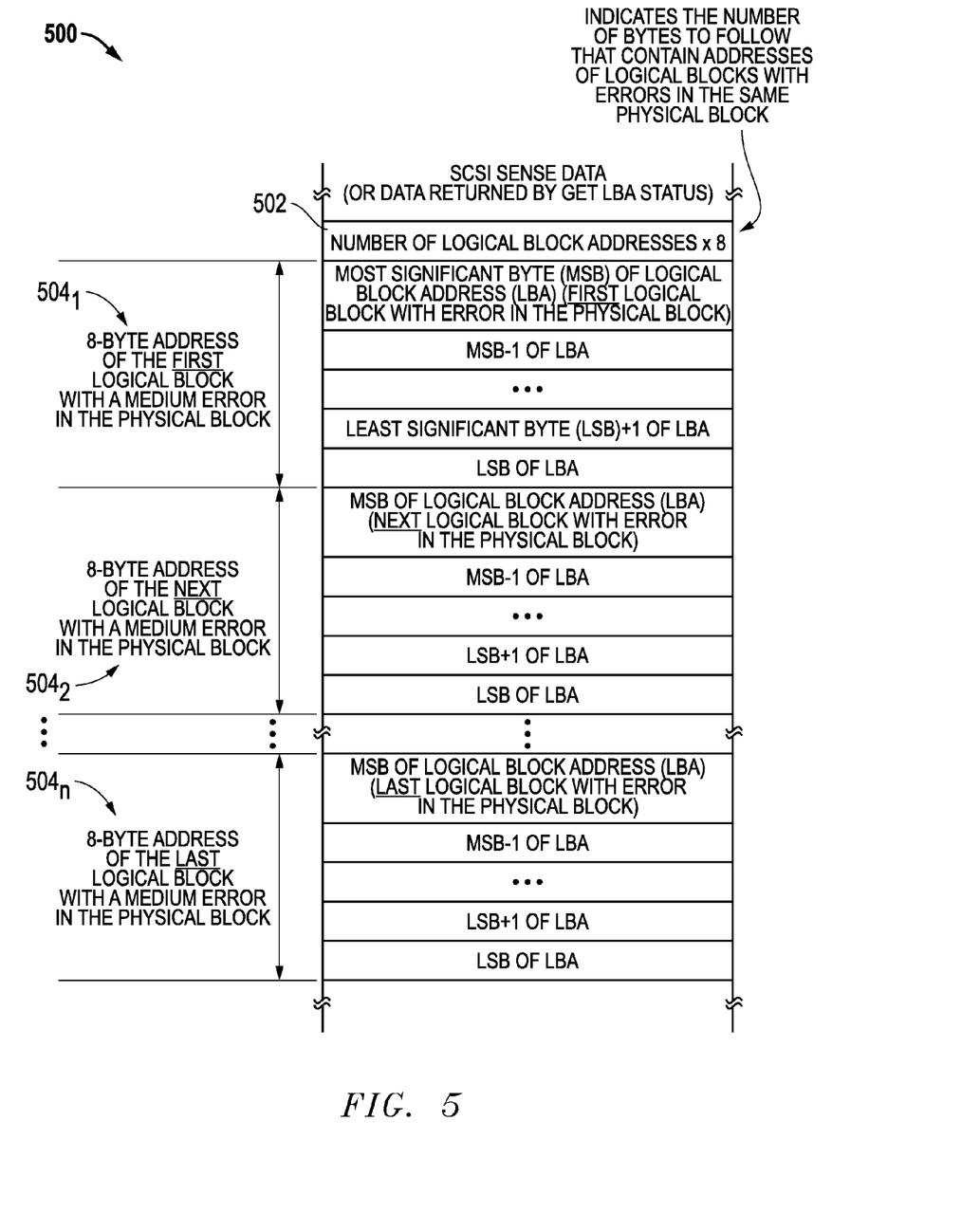
FIG. 5 illustrates a SCSI sense data list according to one exemplary embodiment of the disclosed systems and methods.
Figure 6:
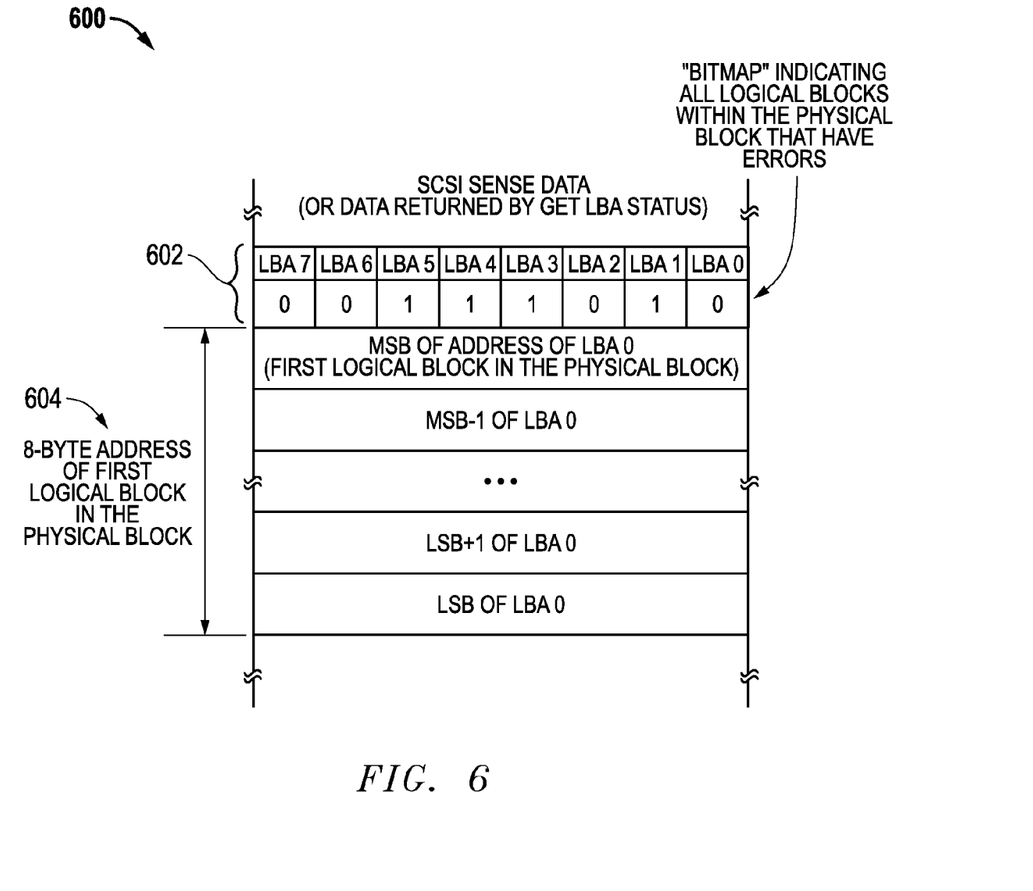
FIG. 6 illustrates a SCSI sense data list according to one exemplary embodiment of the disclosed systems and methods.

FIGS. 5 and 6 illustrate respective exemplary data configurations that may be employed to report the identity of particular logical blocks (or other type of information units) that have detected medium errors within a given physical block (or other type of composite information structure), such as in step 308 of FIG. 3. It will be understood that the data configurations of FIGS. 5 and 6 are exemplary only, and that any other data configuration may be used that is suitable for indicating the identity or address of a given information unit having errors detected therein.

FIG. 5 illustrates one exemplary embodiment of a small computer system interface (SCSI) sense data list 500 of the actual logical block addresses (LBAs) 504$_1$-504$_n$ of each of the multiple emulated 512 byte logical blocks having detected errors within the same current 4096 byte physical block, such as may be reported from an individual hard drive storage device of RAID storage memory system 202 to RAID controller 230 in step 308 of FIG. 3. As shown, SCSI sense data list 500 may also include an initial entry 502 that indicates the number of bytes to follow in the list 500 that contain addresses of logical blocks having errors within the current physical block. In one embodiment, LBAs 504 of list 500 may only include LBAs of emulated 512 byte logical blocks that have detected errors within the same current 4096 byte physical block. In this embodiment, a storage device disk controller may send the LBA list of all logical blocks with detected errors within the same physical block as part of the SCSI sense data returned to the RAID controller, e.g., when a read operation to one of the logical blocks in the physical block fails. In one example of implementing this embodiment, the SCSI GET LBA STATUS command may be modified to accept an additional flag and to return a list of multiple logical blocks having medium errors within the same physical block. In response, RAID correction logic may be applied efficiently (e.g., by a RAID controller) to correct multiple logical blocks having medium errors in the same regeneration operation, e.g., such as described in steps 310 and 312 of FIG. 3.

FIG. 6 illustrates another exemplary embodiment of a SCSI sense data list 600 in which the LBA 604 of the first emulated 512 byte logical block in a 4096 byte physical block is reported together with a bitmap 602 that indicates the location of multiple logical blocks having medium errors within the same physical block. (i.e., logical blocks 1, 3, 4 and 5) having medium errors within the same physical block, i.e., "0" bit represents good block and "1" bit represents bad block. In this embodiment, a Storage device may send the LBA 604 of the first logical block (i.e., LBA 0) within the physical block together with the bitmap 602 of all logical blocks with medium errors within that physical block as part of the SCSI sense data. In one example of implementing this embodiment, the SCSI GET LBA STATUS command may return the address of the first logical block within the physical block and a bitmap of all logical blocks with medium errors within that physical block. In response, RAID correction logic may be applied efficiently to correct multiple logical blocks having medium errors within the same regeneration operation, e.g., such as described in steps 310 and 312 of FIG. 3.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

It will be understood that one or more of the tasks, functions, or methodologies described herein (e.g., including the methodology of FIG. 3) may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
at least one storage device including storage media;
at least one first processing device coupled to the storage device and configured to access the storage media for reading and writing data on the storage media as individual composite information structures having a first data size, and to provide data read from the storage media and to accept data for writing to the storage media as emulated information units having a second data size, the second data size being smaller than the first data size such that each composite information structure is subdivided into multiple smaller emulated information units; and
one or more second processing devices coupled to the first storage device and configured to provide data to the first processing device for writing as the emulated information units, and to accept read data from the first processing device as emulated information units;
where the first processing device is further configured to detect the identity of multiple emulated information units having storage medium errors within a given composite information structure during a given access to the given composite information structure for input/output (I/O) operations on one or more of the emulated information units, and to then report the identity of the multiple detected emulated information units having medium errors within the same accessed composite information structure at the same time to the second processing devices.

2. The system of claim 1, where each composite data structure is a physical data block; and where each of the multiple emulated information units of a given physical data block is an emulated logical block.

3. The system of claim 2, where each physical data block has a 4096 byte data size; and where each emulated logical block has a 512 byte data size.

4. The system of claim 2, where the first processing device is further configured to detect the identity of all emulated logical blocks having storage medium errors within the given physical block during a given access to the given physical block for I/O operations on a portion of the emulated logical blocks of the given physical block that is less than all of the emulated logical blocks in the given physical block, and to report the identity of all detected logical blocks having medium errors within the same given accessed physical block at the same time by communicating to the second processing device a list of the logical block addresses of all detected logical blocks having medium errors within the given accessed physical block.

5. The system of claim 2, where the first processing device is further configured to detect the identity of all emulated logical blocks having storage medium errors within the given physical block during a given access to the given physical block for I/O operations on a portion of the emulated logical blocks of the given physical block that is less than all of the emulated logical blocks in the given physical block, and to report the identity of all detected logical blocks having medium errors within the same given accessed physical block at the same time by communicating to the second processing device a logical block address of the first logical block in the given accessed physical block together with a bitmap of all detected logical blocks having medium errors within the given accessed physical block.

6. The system of claim 2, where the first processing device is communicatively coupled to the second processing device by a small computer system interface (SCSI); and where the first processing device is further configured to detect the identity of all emulated logical blocks having storage medium errors within the given physical block during a given access to the given physical block for I/O operations on a portion of the emulated logical blocks of the given physical block that is less than all of the emulated logical blocks in the given physical block, and to report the identity of all detected logical blocks having medium errors within the same given accessed physical block at the same time by communicating to the second processing device at least one of:
a list of the logical block addresses of all detected logical blocks having medium errors within the given accessed physical block; or
a logical block address of the first logical block in the given accessed physical block together with a bitmap of all detected logical blocks having medium errors within the given accessed physical block.

7. The system of claim 1, further comprising a redundant array of independent disks (RAID) storage memory that includes an array of hard disk drive storage devices that each include storage media and a disk controller configured for accessing the storage media; where the first processing device comprises the disk controller of one of the hard disk drive storage devices; where the second processing devices comprises a RAID controller; and where the disk controller is configured to detect the identity of all emulated logical blocks having storage medium errors within the given physical block during a given access to the given physical block for I/O operations on a portion of the emulated logical blocks of the given physical block that is less than all of the emulated logical blocks in the given physical block, and to report the identity of all detected logical blocks having medium errors within the same given accessed physical block at the same time to the RAID controller.

8. The system of claim 7, where the RAID controller is configured to respond to the report of all detected emulated logical blocks having medium errors within the given accessed physical block by controlling the regeneration of all detected emulated logical blocks having medium errors within the given accessed physical block from a mirror image drive of another storage device in the RAID storage memory, or by using parity information from the RAID storage memory.

9. The system of claim 8, where the RAID controller is configured to respond to the report of all detected emulated logical blocks having medium errors within the given accessed physical block by controlling the regeneration of at least one emulated logical block having a detected given medium error that is not the subject of a current read operation before detection of the given medium error during an access by the first processing device to the given physical block for an attempted read operation or read-modify-write operation on the at least one emulated logical block.

10. The system of claim 8, further comprising a host processing device coupled to the RAID controller and the disk controller, the host processing device configured to execute at least one application, operating system, or combination thereof that is configured to exchange data with the hard disk drive storage devices of the RAID storage memory as emulated logical blocks having the first data size and that is incapable of exchanging data with the hard disk drive storage devices of the RAID storage memory as physical blocks having the second data size.

11. A method for operating a storage device that includes storage media, comprising:
using at least one first processing device to access the storage media of the storage device for reading and writing data on the storage media as individual composite information structures having a first data size, and to provide data read from the storage media and to accept data for writing to the storage media as emulated information units having a second data size, the second data size being smaller than the first data size such that each composite information structure is subdivided into multiple smaller emulated information units;
using one or more second processing devices to provide data to the first processing device for writing as the emulated information units, and to accept read data from the first processing device as emulated information units; and
using the first processing device to detect the identity of multiple emulated information units having storage medium errors within a given composite information structure during a given access to the given composite information structure for input/output (I/O) operations on one or more of the emulated information units, and to then report the identity of the multiple detected emulated information units having medium errors within the same accessed composite information structure at the same time to the second processing devices.

12. The method of claim 11, where each composite data structure is a physical data block; and where each of the multiple emulated information units of a given physical data block is an emulated logical block.

13. The method of claim 12, where each physical data block has a 4096 byte data size; and where each emulated logical block has a 512 byte data size.

14. The method of claim 12, further comprising using the first processing device to detect the identity of all emulated logical blocks having storage medium errors within the given physical block during a given access to the given physical block for I/O operations on a portion of the emulated logical blocks of the given physical block that is less than all of the emulated logical blocks in the given physical block, and to report the identity of all detected logical blocks having medium errors within the same given accessed physical block at the same time by communicating to the second processing device a list of the logical block addresses of all detected logical blocks having medium errors within the given accessed physical block.

15. The method of claim 12, further comprising using the first processing device to detect the identity of all emulated logical blocks having storage medium errors within the given physical block during a given access to the given physical block for I/O operations on a portion of the emulated logical blocks of the given physical block that is less than all of the emulated logical blocks in the given physical block, and to report the identity of all detected logical blocks having medium errors within the same given accessed physical block at the same time by communicating to the second processing device a logical block address of the first logical block in the given accessed physical block together with a bitmap of all detected logical blocks having medium errors within the given accessed physical block.

16. The method of claim 12, where the first processing device is communicatively coupled to the second processing device by a small computer system interface (SCSI); and where the method further comprises using the first processing device to detect the identity of all emulated logical blocks having storage medium errors within the given physical block during a given access to the given physical block for reading from a portion of the emulated logical blocks of the given physical block that is less than all of the emulated logical blocks in the given physical block, and to report the identity of all detected logical blocks having medium errors within the same given accessed physical block at the same time by communicating to the second processing device at least one of:
a list of the logical block addresses of all detected logical blocks having medium errors within the given accessed physical block; or
a logical block address of the first logical block in the given accessed physical block together with a bitmap of all detected logical blocks having medium errors within the given accessed physical block.

17. The method of claim 11, wherein the storage device comprises one hard disk drive storage device of a redundant array of independent disks (RAID) storage memory that includes an array of hard disk drive storage devices that each include storage media and a disk controller configured for accessing the storage media; where the first processing device comprises the disk controller of one of the hard disk drive storage devices; where the second processing devices comprises a RAID controller; and where the method further comprises using the disk controller to detect the identity of all emulated logical blocks having storage medium errors within the given physical block during a given access to the given physical block for I/O operations on a portion of the emulated logical blocks of the given physical block that is less than all of the emulated logical blocks in the given physical block, and to report the identity of all detected logical blocks having medium errors within the same given accessed physical block at the same time to the RAID controller.

18. The method of claim 17, further comprising using the RAID controller to respond to the report of all detected emulated logical blocks having medium errors within the given accessed physical block by controlling the regeneration of all detected emulated logical blocks having medium errors within the given accessed physical block from a mirror image drive of another storage device in the RAID storage memory, or by using parity information from the RAID storage memory.

19. The method of claim 18, further comprising using the RAID controller to respond to the report of all detected emulated logical blocks having medium errors within the given accessed physical block by controlling the regeneration of at least one emulated logical block having a detected given medium error that is not the subject of a current read operation before detection of the given medium error during an access by the first processing device to the given physical block for an attempted read operation or read-modify-write operation on the at least one emulated logical block.

20. The method of claim 18, further comprising using a host processing device to execute at least one application, operating system, or combination thereof to exchange data with the hard disk drive storage devices of the RAID storage memory as emulated logical blocks having the first data size; and where the at least one application, operating system, or combination thereof is incapable of exchanging data with the hard disk drive storage devices of the RAID storage memory as physical blocks having the second data size.

* * * * *